United States Patent
Jung et al.

(10) Patent No.: US 7,697,940 B2
(45) Date of Patent: Apr. 13, 2010

(54) NETWORK APPARATUS FOR STABLE HANDOFF IN IP-BASED MOBILE AD HOC NETWORK SYSTEM, AND HANDOFF METHOD USING THE SAME

(75) Inventors: Hye-young Jung, Seoul (KR); Byung-in Mun, Suwon-si (KR); Woon-jae Chung, Gunpo-si (KR); Hyeong-seok Kim, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1489 days.

(21) Appl. No.: 10/886,666

(22) Filed: Jul. 9, 2004

(65) Prior Publication Data
US 2005/0088993 A1 Apr. 28, 2005

(30) Foreign Application Priority Data
Oct. 22, 2003 (KR) .................. 10-2003-0073958

(51) Int. Cl.
*H04Q 7/20* (2006.01)
(52) U.S. Cl. ............... 455/456.1; 455/440; 455/414.1; 455/450; 455/452.2
(58) Field of Classification Search ............... 370/351, 370/389; 455/456.1, 436, 441, 440, 414.1
See application file for complete search history.

(56) References Cited

U.S. PATENT DOCUMENTS

| | | | |
|---|---|---|---|
| 6,377,805 B1 | 4/2002 | Anvekar et al. | |
| 7,054,646 B2 * | 5/2006 | Naghian | 455/456.1 |
| 2002/0085719 A1 | 7/2002 | Crosbie | |
| 2002/0133534 A1 | 9/2002 | Forslow | |
| 2003/0179742 A1 * | 9/2003 | Ogier et al. | 370/351 |
| 2004/0192331 A1 * | 9/2004 | Gorday et al. | 455/456.1 |
| 2006/0007863 A1 * | 1/2006 | Naghian | 370/238 |

FOREIGN PATENT DOCUMENTS

| | | |
|---|---|---|
| EP | 1 111 874 A1 | 5/2001 |
| EP | 1 345 370 A2 | 9/2003 |
| JP | 2002-171558 A | 6/2002 |
| JP | 2003-78573 A | 3/2003 |
| JP | 2003-169061 A | 6/2003 |

(Continued)

*Primary Examiner*—Charles N Appiah
*Assistant Examiner*—Randy Peaches
(74) *Attorney, Agent, or Firm*—Sughrue Mion, PLLC

(57) ABSTRACT

A network apparatus for a stable handoff in an IP-based mobile ad hoc network system and a handoff method using the same. Present invention enables a handoff to be stably performed by pre-configuring a handoff to a new access router. The network apparatus of the present invention comprises a movement-determining unit for determining movement depending on the signal strength upon reception of a packet among network apparatuses operating on a communication mobile ad hoc network, and deciding a handoff to a new access router; a router-configuring unit for configuring information on the new access router for the handoff by performing beforehand the handoff to the new access router according to the results of the determination in the movement-determining unit; and a handoff-processing unit for performing the handoff to the new access router using the pre-configured information according to the determination in the movement-determining unit.

11 Claims, 13 Drawing Sheets

FOREIGN PATENT DOCUMENTS

| | | |
|---|---|---|
| JP | 2003-230167 A | 8/2003 |
| JP | 2003-230169 A | 8/2003 |
| JP | 2003-274452 A | 9/2003 |
| JP | 2005-538592 A | 12/2005 |
| WO | WO 02/078272 A1 | 10/2002 |
| WO | WO 2004/023740 A1 | 3/2004 |

* cited by examiner

FIG. 5a

NI Req message

| Type | Identifier |
|---|---|
| 8bits | 16bits |

FIG. 5b

NI Req message

| Type | Identifier | Router Address | Prefix Information |
|---|---|---|---|
| 8bits | 16bits | 64bits | n bits |

FIG. 5c

NM message

| Type | Identifier | Router Address |
|---|---|---|
| 8bits | 16bits | 64bits |

FIG. 5d

NM ACK message

| Type | Identifier |
|---|---|
| 8bits | 16bits |

CoA List

| Access Router Address |
|---|
| Prefix Information |
| Care of Address |
| Life Time |

NETWORK APPARATUS FOR STABLE HANDOFF IN IP-BASED MOBILE AD HOC NETWORK SYSTEM, AND HANDOFF METHOD USING THE SAME

BACKGROUND OF THE INVENTION

This application claims the priority of Korean Patent Application No. 10-2003-0073958 filed on Oct. 22, 2003, in the Korean Intellectual Property Office, the disclosure of which is incorporated herein in its entirety by reference.

1. FIELD OF THE INVENTION

Apparatuses and methods consistent with the present invention relate to a network apparatus for a stable handoff in an IP-based mobile ad hoc network system and a handoff method using the same. More particularly, the present invention provides a stable communication network through pre-configured router information when a mobile ad hoc network apparatus has completely moved to a new access router coverage, by allowing a handoff module of the network apparatus to detect movement depending on the signal strength of a received packet and to pre-configure a handoff to the new access router.

2. DESCRIPTION OF THE RELATED ART

A mobile ad hoc network (hereinafter, referred to as "MANET") refers to a network through which mobile network apparatuses can communicate with one another in an environment without communication infrastructures.

In an environment, such as a battlefield, an airplane or a ship, isolated from the external Internet, there is often a need for temporary establishment of a network when communications through network apparatuses are required.

Recently, as needs for MANETs increase, there is growing interest in technologies that enable communications among network apparatuses in the MANETs.

Particularly, there have been attempts to apply mobile IPs to MANETs so that free Internet services can be provided by allocating predetermined IPs to network apparatuses in the MANETs.

As a result of these attempts, a wireless Internet service is implemented in an IPv4-based MANET. In the case of IPv4 that is being currently used, there are limitations on IP addresses that can be allocated to respective network apparatuses. As such, the current technology does not fully meet the demands of increasing users for network apparatuses.

Accordingly, research has been conducted on applying IPv6, which was designed to solve the problem of insufficient IPs by improving the currently used IPv4, to MANETs. However, there is a problem as follows. Each network apparatus in a MANET environment operates as both a router and a host. The current method of detecting movement in existing IPv6 in which all network apparatuses receive a router advertisement (hereinafter, referred to as "RA") message that is periodically broadcast from an access router, detect movement to a new access router coverage and perform a handoff is not suitable for a MANET in which the network topology continues to change as network apparatuses are moved.

In other words, an RA message that is periodically broadcast from a current access router according to existing IPv6 is spread over the entire MANET through multi-hop links formed as the network apparatuses are moved. This causes an increase in traffic in the network and produces a serious obstacle to general communications among network apparatuses.

Furthermore, as shown in FIG. 1a, network apparatuses in an IPv6-based MANET receive an RA message that is periodically broadcast from an access router (hereinafter, referred to as "AR").

As shown in FIG. 1b, if network apparatus A has moved from the coverage of a current access router AR1 into the coverage of a new access router AR2, network apparatus A detects that it has moved into the coverage of the new access router AR2 through an RA message received from the new access router AR2.

Next, in order to establish communications through the new access router AR2, network apparatus A terminates communications with the current access router AR1 and then refers to the received RA message to perform a handoff for establishing communications with the new access router AR2.

When the handoff is performed, network apparatus A stores communication packets in its cache from a moment when interrupt occurs in response to the detection of the movement to the new access router AR2, and then sends the stored communication packets after connection to the new access router AR2 has been made. For this reason, there is a problem in that communications are temporarily interrupted.

Accordingly, there is an urgent need for a stable handoff method that can reduce network traffic due to the movement-detecting method based on IPv6 and provide seamless communications even when a handoff is performed in a MANET.

SUMMARY OF THE INVENTION

The present invention is conceived to solve the aforementioned problems. An aspect of the present invention is to provide a stable handoff even when a network apparatus moves to a new access router coverage in such a manner that a handoff to a new access router is pre-configured by detecting movement based on signal strength upon reception of a packet among network apparatuses that operate on a mobile ad hoc network.

Another aspect of the present invention is to minimize the increase of traffic in a MANET based on existing mobile IPv6 by requesting information on an access router when movement is detected through the strength of a received signal.

According to the present invention, a handoff module configures router information on a new access router or performs a handoff, by determining movement of a network apparatus based on signal strength upon reception of a packet and then performing beforehand a handoff-configuring operation that is required at the time of a handoff.

Therefore, the handoff module performs a handoff to the new access router based on pre-configured router information when a network apparatus has completely moved into the coverage of the new access router.

According to the present invention, threshold values for detecting movement of a network apparatus are set. A router-configuring operation for a handoff to a new access router according to the movement of the network apparatus, or a handoff to the new access router is performed by comparing the set threshold values with the signal strength upon reception of a packet.

In the present invention, the threshold values roughly include an α-threshold value that is a threshold value for the strength of power upon reception of a packet, which varies as a network apparatus moves from the coverage of a current access router into the coverage of a new access router, and a β-threshold value that is a threshold value for the strength of power upon reception of a packet, which varies as a network apparatus has completely moved into the coverage of a new access router.

According to an aspect of the present invention, there is provided a network apparatus for a stable handoff in an IP-based mobile ad hoc network system, comprising a movement-determining unit for determining movement depending on the signal strength upon reception of a packet among network apparatuses operating on a communication mobile ad hoc network, and deciding a handoff to a new access router; a router-configuring unit for configuring information on the new access router for the handoff by performing beforehand the handoff to the new access router according to the results of the determination in the movement-determining unit; and a handoff-processing unit for performing the handoff to the new access router by using the pre-configured information according to the results of the determination in the movement-determining unit.

According to another aspect of the present invention, there is provided a handoff method using a network apparatus for a stable handoff in an IP-based mobile ad hoc network system, comprising the steps of determining movement according to the signal strength of a packet received from a given network apparatus operating on a communication mobile ad hoc network; requesting neighbor information so as to collect information on a new access router in a region to which a network apparatus moves, according to the determination results of the movement; and if a reply message in response to the request is received, deciding a handoff according to the signal strength upon reception of the packet.

BRIEF DESCRIPTION OF THE DRAWINGS

The above and other aspects, features and advantages of the present invention will become apparent from the following description of exemplary embodiments given in conjunction with the accompanying drawings, in which:

FIGS. 5a to 5e schematically show formats of message packets according to an embodiment of the present invention;

FIG. 6 schematically shows state transitions for a handoff according to an embodiment of the present invention;

DETAILED DESCRIPTION OF THE INVENTION

Hereinafter, a network apparatus for a stable handoff in an IP-based mobile ad hoc network system and a handoff method using the network apparatus according to embodiments of the present invention will be described in detail with reference to the accompanying drawings.

In the description of the network apparatus for stable handoff in an IP-based mobile ad hoc network system and the handoff method using the network apparatus according to the present invention, they will be described as being implemented using a predetermined handoff module in an IPv6-based mobile ad hoc network apparatus. However, it is for illustrative purposes only. It can be understood by those skilled in the art that various modifications and other equivalent embodiments can be made to a method of detecting movement depending on the signal strength upon reception of a packet among network apparatuses to pre-configure a handoff to a new access router, and then using pre-configured handoff information at the time of a handoff.

First, a network apparatus for a stable handoff in an IP-based mobile ad hoc network system according to an embodiment of the present invention will be described in detail with reference to the accompanying drawings.

Figure 1A:
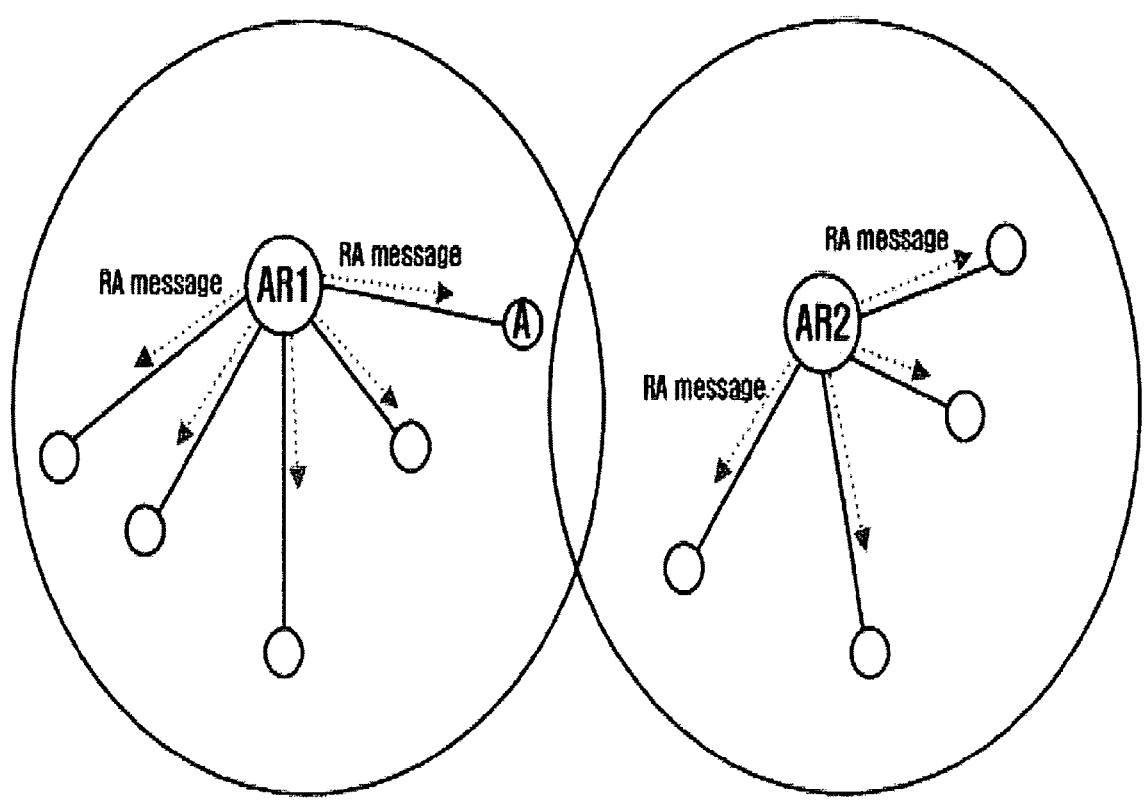
FIGS. 1a and 1b are views schematically showing the configuration of a conventional IP-based network system.
Figure 1B:
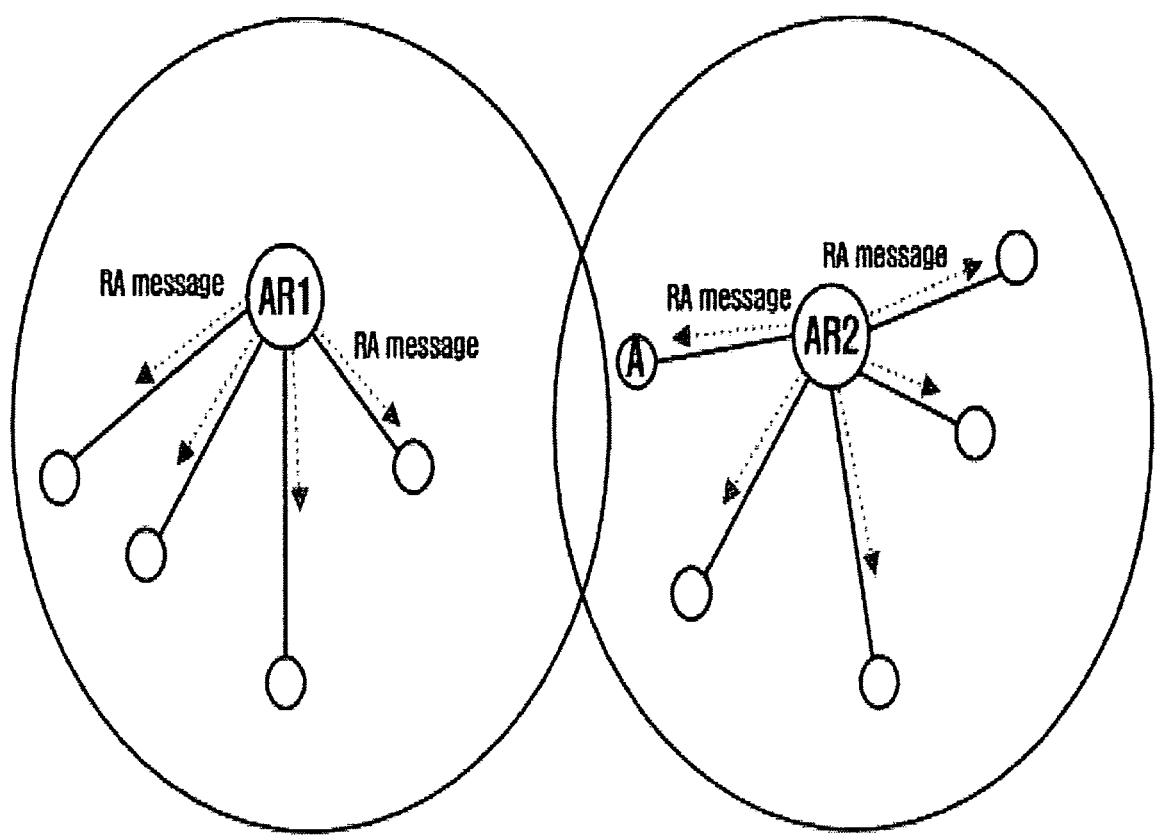
Figure 2:
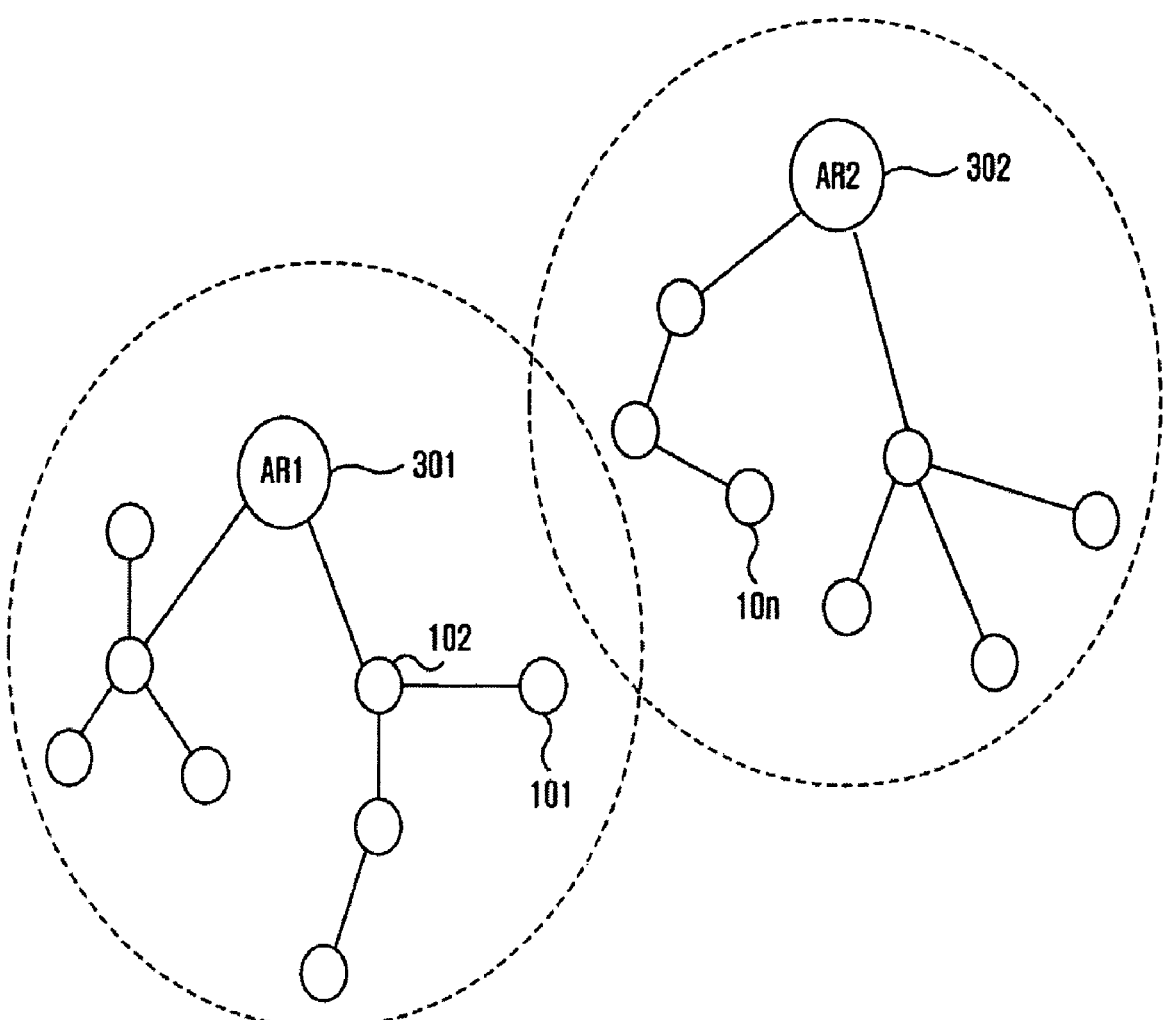
FIG. 2 is a view schematically showing the configuration of an IP-based mobile ad hoc network system according to an embodiment of the present invention.

FIG. 2 is a view schematically showing the configuration of an IP-based mobile ad hoc network system according to an embodiment of the present invention.

As shown in FIG. 2, the mobile network system of the present invention comprises a plurality of network apparatuses 101, 102, . . . and 10n (hereinafter, collectively designated by reference numeral 100), a current access router 301 for providing Internet service to all or some of the plurality of the network apparatuses 100, which operate within a predetermined network coverage, and a new access router 302 to which one of the network apparatuses 100 in the coverage of the current access router 301 moves.

One of the network apparatuses 100 is connected to the current access router 301 through communication links with other network apparatuses 100 to use the provided Internet service. Each apparatus 100 includes a handoff module that determines movement according to the signal strength of a packet that is received from another network apparatus 100 connected via a communication link, and performs beforehand a handoff-configuring operation required for a handoff to the new access router 302 or performs a handoff to the new access router 302, according to the results of the determination.

Figure 3:
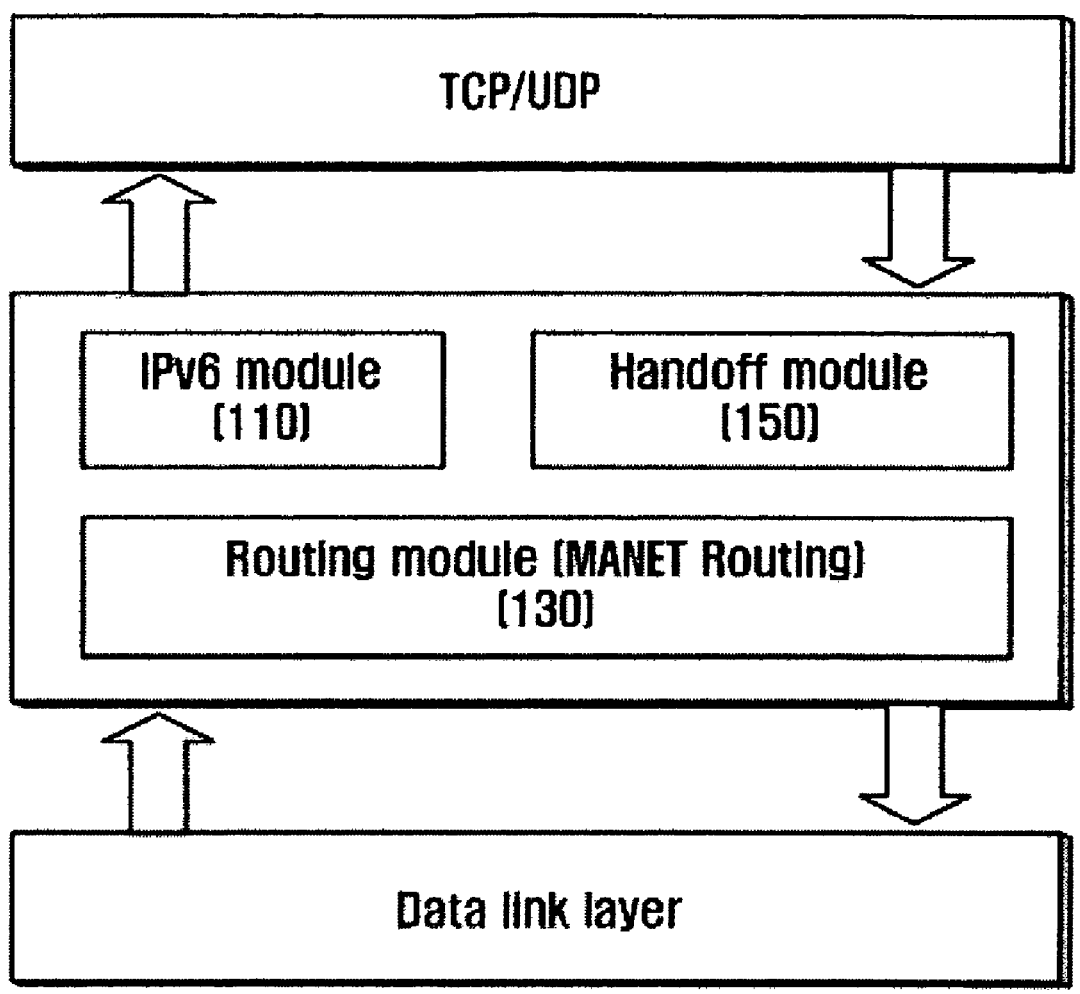
FIG. 3 schematically shows a protocol structure according to an embodiment of the present invention.

FIG. 3 schematically shows a protocol structure of a network apparatus (hereinafter, referred to as "first network apparatus 101") according to an embodiment of the present invention. Since other network apparatuses 102, 103, . . . and 10n have the same protocol structure as the first network apparatus 101, the illustration thereof is omitted in this figure.

As shown in FIG. 3, the protocol structure according to the present invention mainly comprises a transport layer (TCP/UDP) as a basic protocol layer used for the transmission of information on the Internet, a network layer for IP-based mobile ad hoc networking through the TCP/UDP, and a data link layer as a protocol layer, which is responsible for transmission/reception of data through a physical link within a network formed through the network layer.

The network layer comprises an IPv6 module 110 as an IP service module for transmission/reception of packets on the Internet, a routing module (MANET routing) 130 for mobile networking, and a handoff module 150 for a handoff to a new access router depending on movement of a network apparatus in an IPv6-based mobile networking process.

Figure 4:
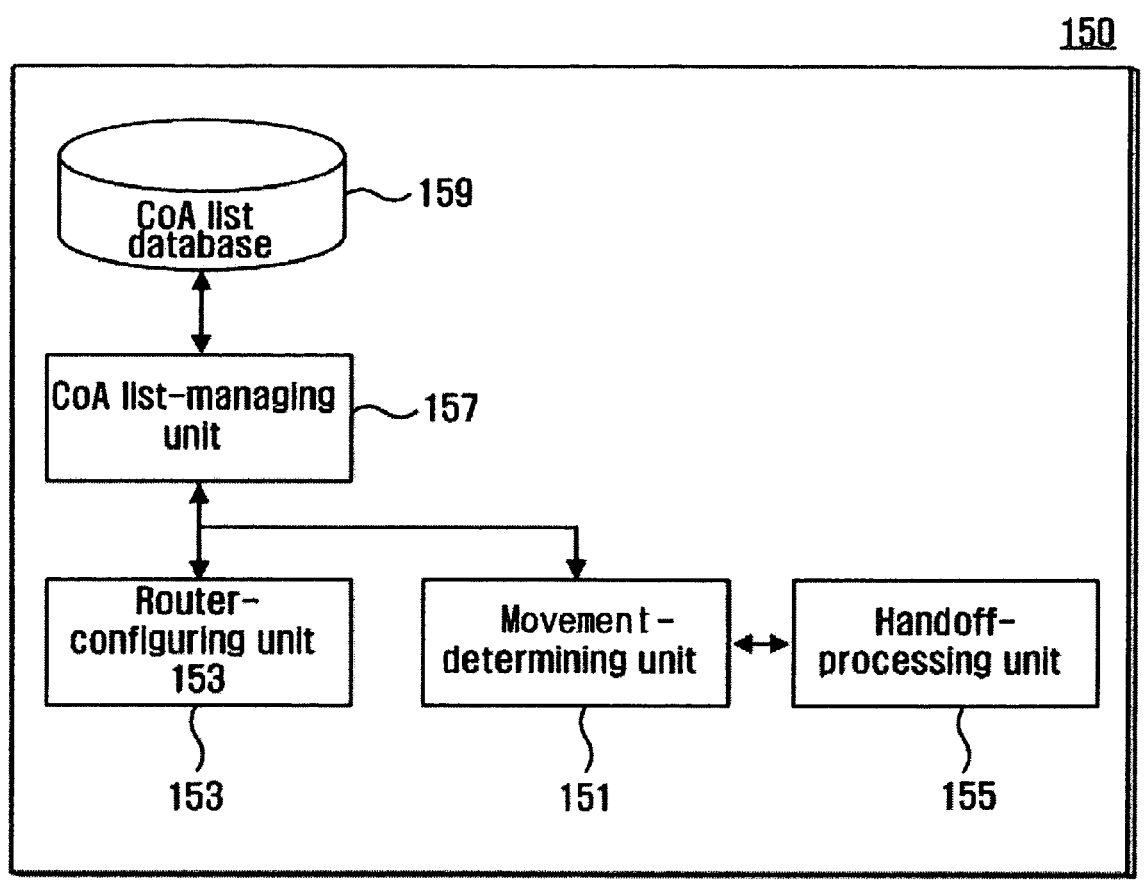
FIG. 4 is a block diagram schematically showing the configuration of a handoff module 150 shown in FIG. 3 according to an embodiment of the present invention.

FIG. 4 is a block diagram schematically showing the configuration of a handoff module 150 shown in FIG. 3 according to an embodiment of the present invention.

As shown in FIG. 4, the handoff module 150 comprises a movement-determining unit 151, a router-configuring unit 153, a handoff-processing unit 155, a care-of-address (hereinafter, referred to as "CoA") list-managing unit 157, and a CoA list database (DB) 159.

The movement-determining unit 151 compares the signal strength of a packet received from a network apparatus (hereinafter, referred to as "second network apparatus 102") connected via a communication link with predetermined threshold values to determine a direction in which the network apparatus 101 moves, and then determines a handoff to the new access router 302 or configures information for a handoff, according to the results of the determination.

The threshold values may roughly include an α-threshold value that is a threshold value for the strength of a received packet which is changed as the network apparatus 101 moves from the coverage of the current access router 301 into the coverage of the new access router 302, and a β-threshold value that is a threshold value for the strength of a received packet which is changed as the network apparatus 101 has completely moved into the coverage of the new access router.

The α-threshold value and the β-threshold value are calculated based on the following formulas:

$$\alpha\text{-threshold} = \max\_SS \times \alpha \times SNR$$

$$\beta\text{-threshold} = \max\_SS \times \beta \times SNR$$

max_SS: maximum signal strength
α, β: predetermined functions (α>β)
SNR: signal to noise ratio.

Upon configuring information for a handoff, the movement-determining unit 151 broadcasts a neighbor information request (hereinafter, referred to as "NI Req") message, which requests network apparatuses 100 in a range of 1 hop to transmit neighbor information (e.g., id, name, address, port, etc.) in order to collect information on the new access router 302.

Then, a movement-determining unit of each network apparatus 100 sends a neighbor information reply (hereinafter, referred to as "NI Rep") message in response to the received NI Req message.

At this time, since each network apparatus 100 has been set to operate in a promiscuous mode, it checks NI Rep messages that neighboring nodes transmit to the network apparatus that has broadcasted the NI Req message. As a result of the check, if there is a message having the same access router address as itself, the network apparatus 100 does not send an NI Rep message.

Accordingly, there is no traffic occurring due to overlapping NI Rep messages on the network.

The router-configuring unit 153 creates a CoA for the new access router 302 (hereinafter, referred to as "nCoA") using information obtained from the NI Rep message provided depending on the results of the determination in the movement-determining unit 151.

The handoff-processing unit 155 terminates communications with the current access router 301 according to the result of the determination in the movement-determining unit 151, and then performs a handoff that configures connection with the new access router 302 by using the created nCoA.

At the time of the handoff, the handoff-processing unit 105 sends the current access router 301 a notify movement (hereinafter, referred to as "NM") message that notifies the movement to another region, and transmits a notify movement acknowledgement (hereinafter, referred to as "NM ACK") message received from the current access router 301.

The CoA list-managing unit 157 searches for and provides a requested nCoA, or controls an entire operation for CoA list management, such as deletion and addition of nCoAs.

The CoA list database 159 stores CoAs that are transmitted under the control of the CoA list-managing unit 157.

FIGS. 5a to 5e schematically show formats of message packets according to an embodiment of the present invention.

FIG. 5a shows a format of an NI Req message by which the movement-determining unit 151 requests network apparatuses 100 in a range of 1 hop to transmit neighbor information in order to determine a moving direction of the network apparatus 101.

As shown in FIG. 5a, the NI Req message contains a Type field of 8 bits indicating that this is a message for requesting neighbor information, and an Identifier field of 16 bits indicating information on the network apparatus transmitting this message.

FIG. 5b shows a format of an NI Rep message that is transmitted by one of the neighboring network apparatuses 100 in a range of 1 hop, which has received the NI Req message broadcasted from the movement-determining unit 151 of the network apparatus 101.

As shown in FIG. 5b, the NI Rep message contains a Type field of 8 bits indicating that this is a message including neighbor information, an Identifier field of 16 bits indicating information on the network apparatus 101 that has transmitted the message, a Router Address field of 64 bits indicating an address of an access router, and a Prefix Information field of n bits indicating Prefix information on the access router.

FIG. 5c shows a format of an NM message by which the handoff-processing unit 101 notifies the current access router 301 of a handoff to the new access router 302.

As shown in FIG. 5c, the NM message contains a Type field of 8 bits indicating that this is a message for notifying the movement of the network apparatus 101, an Identifier field of 16 bits indicating information on the network apparatus that has transmitted the message, and a Router Address field of 64 bits indicating an address of a new access router to which the network address will move.

FIG. 5d shows a format of an NM ACK message that is transmitted by a previous access router in response to an NM message.

As shown in FIG. 5d, the NM ACK message contains a Type field of 8 bits indicating that this is a message for acknowledging an NM message from a network apparatus, and an Identifier field of 16 bits indicating information on the current access router that has transmitted this message. The CoA list-managing unit 157 performs all operations such as addition, deletion and search, which are required to manage an nCoA list created through the router-configuring unit 103.

Figures 5E, 6:
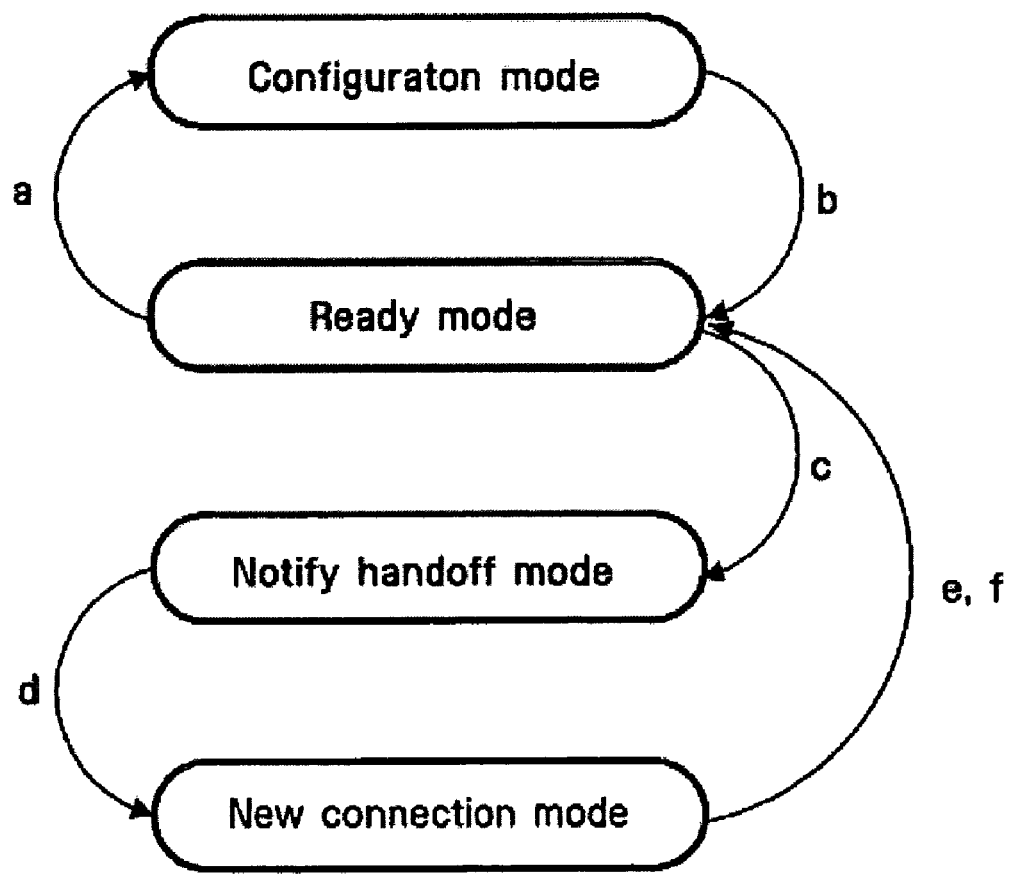

FIG. 5e shows a format of a CoA list for CoA management.

As shown in FIG. 5e, the CoA list contains an Access Router Address field indicating an address of an access router, a Prefix Information field indicating Prefix information of the access router, a Care-of-Address field indicating a temporary address to be used in the coverage of the access router, and a Life Time field indicating time during which a service stands by.

For example, if a user of the first network apparatus 101 moves during the use of an Internet service in a state where it is connected to the current access router 301 via a communication link with the second network apparatus 102, the movement-determining unit 151 detects the movement of the first network apparatus 101 by detecting variation in the signal strength of a packet received from the second network apparatus 102.

The movement-determining unit 151 measures the signal strength of the received packet and then determines whether the measured strength is higher than a β-threshold value and lower than an α-threshold value.

If it is determined that the measured strength is higher than the β-threshold value and lower than the α-threshold value, the movement-determining unit 151 performs a handoff-configuring operation for pre-configuring a handoff depending on the movement of the first network apparatus 101 to the new access router 302.

In other words, the movement-determining unit 151 broadcasts an NI Req message that requests network apparatuses in a range of 1 hop to transmit neighbor information, in order to collect information on the new access router 302 of a region to which the first network apparatus 101 moves.

Thereafter, if the movement-determining unit 151 receives an NI Rep message in response to the broadcasted NI Req message, it determines whether the signal power strength upon reception of the packet is higher than the β-threshold value and lower than the α-threshold value. If it is determined that the signal power strength is higher than the β-threshold value and lower than the α-threshold value, the movement-determining unit 151 transmits the received NI Rep message to the router-configuring unit 153.

Then, the router-configuring unit 153 creates an nCoA for the new access router 302 based on Prefix information of the new access router 302 obtained from the NI Rep message and then registers the created nCoA in the CoA list DB 159 via the CoA list-managing unit 157.

During determination on whether the signal strength of the received packet is higher than the β-threshold value and lower than the α-threshold value, if the signal power strength is lower than the β-threshold value, the movement-determining unit 151 controls the handoff-processing unit 155 to perform a handoff.

In other words, the handoff-processing unit 155 determines whether the nCoA for the new access router 302 exists in the CoA list DB 159 through the CoA list-managing unit 157, and then detects a handoff by using the registered nCoA or creates the nCoA for the new access router 302.

Next, the handoff-processing unit 155 sends the current access router 301 an NM message that notifies the current access router 301 of the movement to the new access router 302 using the detected or created nCoA, and then receives an NM ACK message from the current access router 301.

For reference, in the network apparatus for a stable handoff in the IP-based mobile ad hoc network system described above according to the embodiment of the present invention, all the modules may be implemented with hardware or software, or some of them may be implemented with software.

Therefore, the implementation of the network apparatus for a stable handoff in the IP-based mobile ad hoc network system described above according to the embodiment of the present invention by using hardware and/or software does not depart from the technical spirit of the present invention. It will be apparent to those skilled in the art that modifications and changes accompanied by the implementation with software and/or hardware can be made without departing from the scope of the present invention.

Next, a handoff method using the network apparatus for a stable handoff in the IP-based mobile ad hoc network system constructed as above will be described in detail with reference to the accompanying drawings.

FIG. 6 schematically shows state transitions for a handoff according to an embodiment of the present invention.

As shown in FIG. 6, the handoff method of the present invention mainly includes a ready mode, a configuration mode, a notify handoff mode and a new connection mode. When the first network apparatus 101 operates, it is in the ready mode.

In such a ready mode, if the first network apparatus 101 is moved by a user, the movement-determining unit 151 determines the signal strength of a packet received from the second network apparatus 102, detects the movement from the current access router 301 to the new access router 302 and then broadcasts an NI Req message for requesting neighboring network apparatuses 100 in a range of 1 hop to transmit neighbor information. When the movement-determining unit 151 receives an NI Rep message in response to the NI Req message, it creates an nCoA based on Prefix information of the new access router 302 obtained from the received NI Rep message and then inquires of the new access router 302 about whether the access router 302 intends to use the nCoA.

In such a manner, as the movement-determining unit 151 inquires of the new access router 302 about whether the access router 302 intends to use the nCoA, the first network apparatus 101 is switched to the configuration mode (a) and is again switched to the ready mode if the use of the nCoA is approved by the new access router 302 (b).

In the ready mode, as the first network apparatus 101 is gradually moved to the new access router 302 by the user, the movement-determining unit 151 of the first network apparatus 101 determines whether the first network apparatus 101 has completely moved to the new access router 302.

If it is determined that the first network apparatus 101 has completely moved to the new access router 302, the first network apparatus 101 is switched to the notify handoff mode (c) in which an NM message is transmitted to the current access router 301 in order to perform a handoff to the new access router 302 through the handoff-processing unit 155. Thereafter, the first network apparatus 101 is switched to the new connection mode (d) in which a communication link with the new access router 302 is newly established using the nCoA.

Next, if the first network apparatus 101 receives an NM ACK message from the current access router 301 in response to the transmitted NM message, the first network apparatus 101 is again switched to the ready mode (e).

In the notify handoff mode, however, if the first network apparatus 101 cannot receive an NM ACK message from the previous access router 301 since it has completely moved into the coverage of the new access router 302, the first network apparatus 101 again sends an NM message to the new access router 302 so that the NM message can be sent to the previous access router 301 via the new access router 302.

Accordingly, the network apparatus 101 receives the NM ACK message from the previous access router 301 through the new access router 302 and is thus switched to the ready mode (f).

Processes performed in the respective modules of the network apparatus for a stable handoff according to the present invention will be described below with reference to the accompanying drawings.

Figure 7:
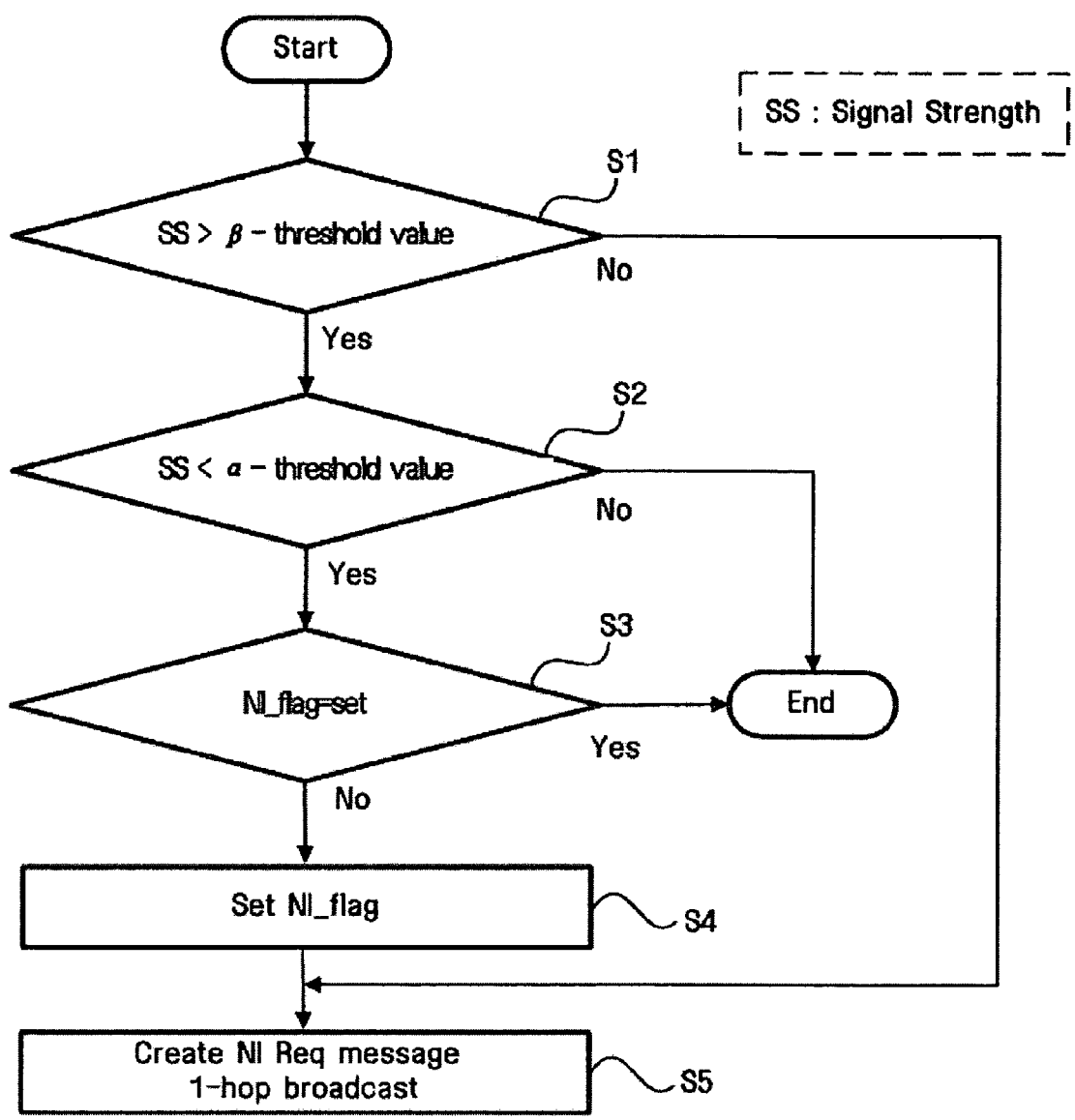
FIG. 7 is a flowchart schematically illustrating a movement-detecting process in a movement-determining unit according to an embodiment of the present invention.

FIG. 7 is a flowchart schematically illustrating a movement-detecting process in the movement-determining unit 151 according to an embodiment of the present invention.

As shown in FIG. 7, the movement-determining unit 151 of the first network apparatus 101 first determines whether the signal strength (hereinafter, referred to as "SS") of a packet that is received from the second network apparatus 102 connected via a communication link is higher than a β-threshold value, in order to determine a handoff (S1).

If it is determined that SS is higher than the β-threshold value, the movement-determining unit 151 determines whether SS is lower than the α-threshold value so as to determine whether to prepare a handoff (S2).

If it is determined that SS is lower than the α-threshold value, the movement-determining unit 151 controls the router-configuring unit 153 to pre-configure a handoff. At this time, in order to prevent the configuring operation from being performed more than once, the movement-determining unit 151 first determines whether the value of NI_flag is equal to "set" (S3).

If it is determined that the value of NI_flag is equal to "set," the process is terminated. Meanwhile, if the value of NI_flag is not equal to "set," NI_flag is set (S4). Thereafter, an NI Req message is created and then broadcasted to network apparatuses 100 in a range of 1 hop (S5).

If SS is higher than the β-threshold value and not lower than the α-threshold value, the movement-determining unit 151 stops its operation.

Figure 8:
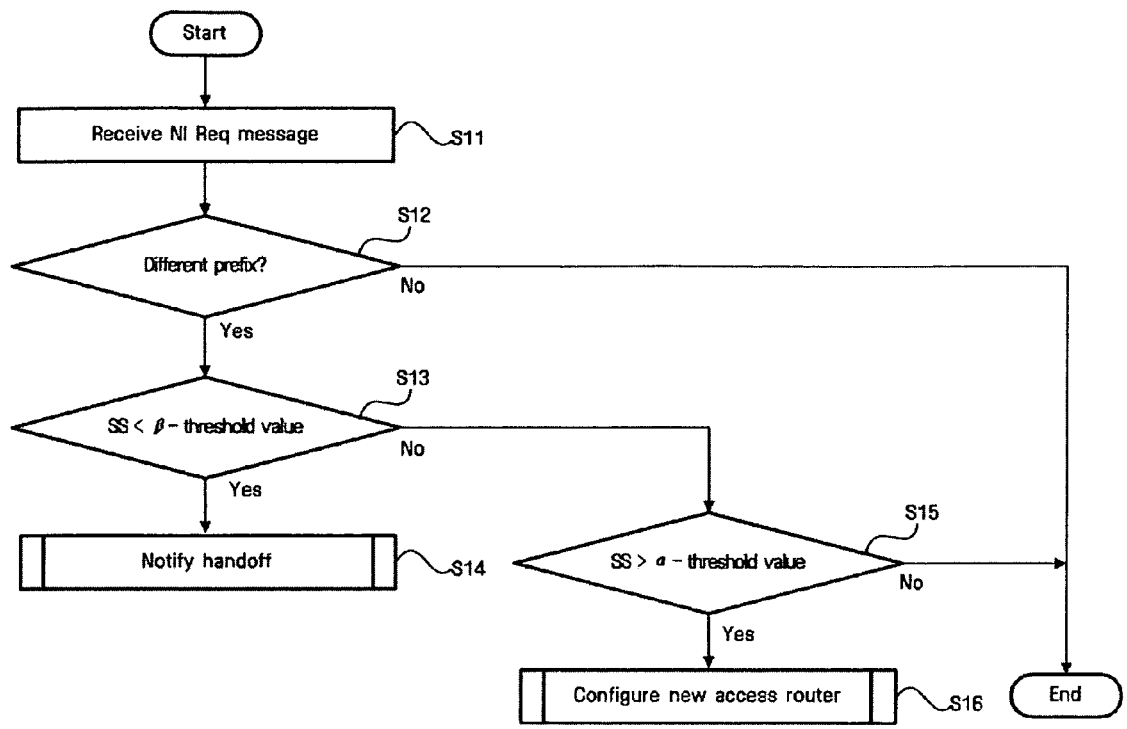
FIG. 8 is a flowchart schematically illustrating a handoff-determining process in the movement-determining unit according to an embodiment of the present invention.

FIG. 8 is a flowchart schematically illustrating a handoff-determining process in the movement-determining unit 151 according to an embodiment of the present invention.

As shown in FIG. 8, each of network apparatuses 100 in the range of 1 hop, which have received the NI Req message broadcasted from the first network apparatus 101, creates an NI Rep message and then transmits it to the first network apparatus 101.

If the first network apparatus 101 receives the NI Rep messages transmitted from the network apparatuses 100 in the range of 1 hop (S11), the first network apparatus 101 compares Prefix information of the current access router 301 with Prefix information of an access router contained in the received messages to determine whether the Prefix information of the two access routers are different from each other (S12).

If it is determined from the comparison that the Prefix information of the two access routers is different, the first network apparatus 101 determines whether SS is lower than the β-threshold value (S13).

If it is determined that SS is lower than the β-threshold value, the first network apparatus 101 causes the handoff-processing unit 155 to perform a notify handoff mode operation by which the current access router 301 is notified of a handoff to the new access router 302 (S14).

Meanwhile, if it is determined that SS is not lower than the β-threshold value, the first network apparatus 101 determines whether SS is higher than the α-threshold value (S15).

If it is determined that SS is higher than the α-threshold value, the first network apparatus 101 causes the router-configuring unit 153 to perform a new access router (NAR)-configuring operation by which a handoff operation is performed in advance in order to configure information on the new access router 302 (S16).

If SS is higher than the β-threshold value and lower than the α-threshold value, the first network apparatus 101 stops its operation.

Figure 9:
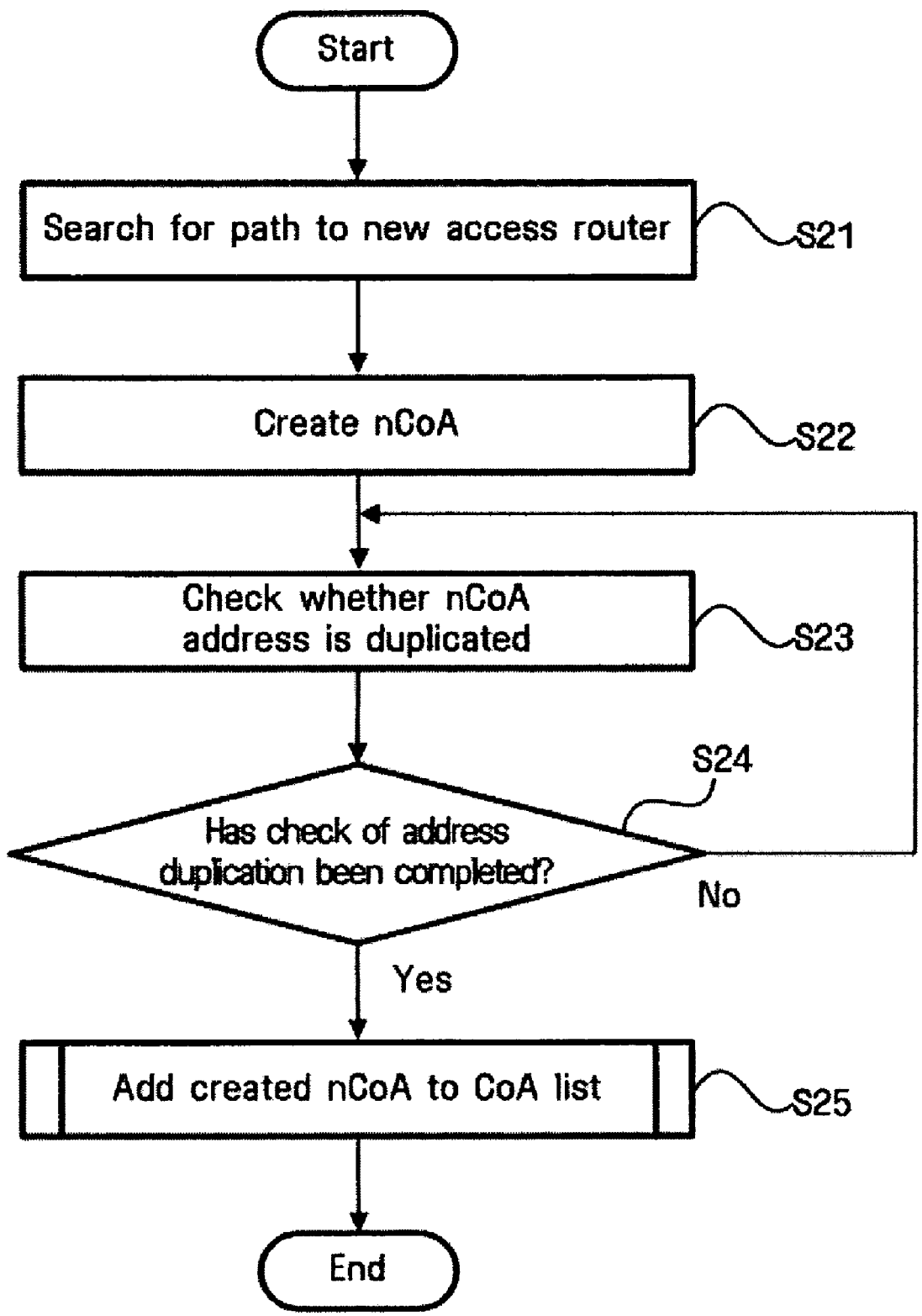
FIG. 9 is a flowchart schematically illustrating a handoff information-configuring process for a new access router in a router-configuring unit according to an embodiment of the present invention.

FIG. 9 is a flowchart schematically illustrating a handoff information-configuring process for the new access router 302 in the router-configuring unit 153 according to an embodiment of the present invention.

As shown in FIG. 9, the router-configuring unit 153 searches for a routing path to the new access router 302 by using information on the new access router 302 obtained from the NI Rep message (S21).

The router-configuring unit 153 then creates an nCoA for the new access router 302 by using Prefix information of the new access router 302 (S22).

Next, the router-configuring unit 153 performs a duplication address detection (DAD) process for inquiring of the new access router 302 about whether the created nCoA is duplicated (S23) and then determines whether the DAD process for the nCoA has been completed (S24). If it is determined that the DAD process for the nCoA has been completed, the router-configuring unit 153 adds the created nCoA to the CoA list DB 159 through the CoA list-managing unit 157 (S25).

Figure 10:
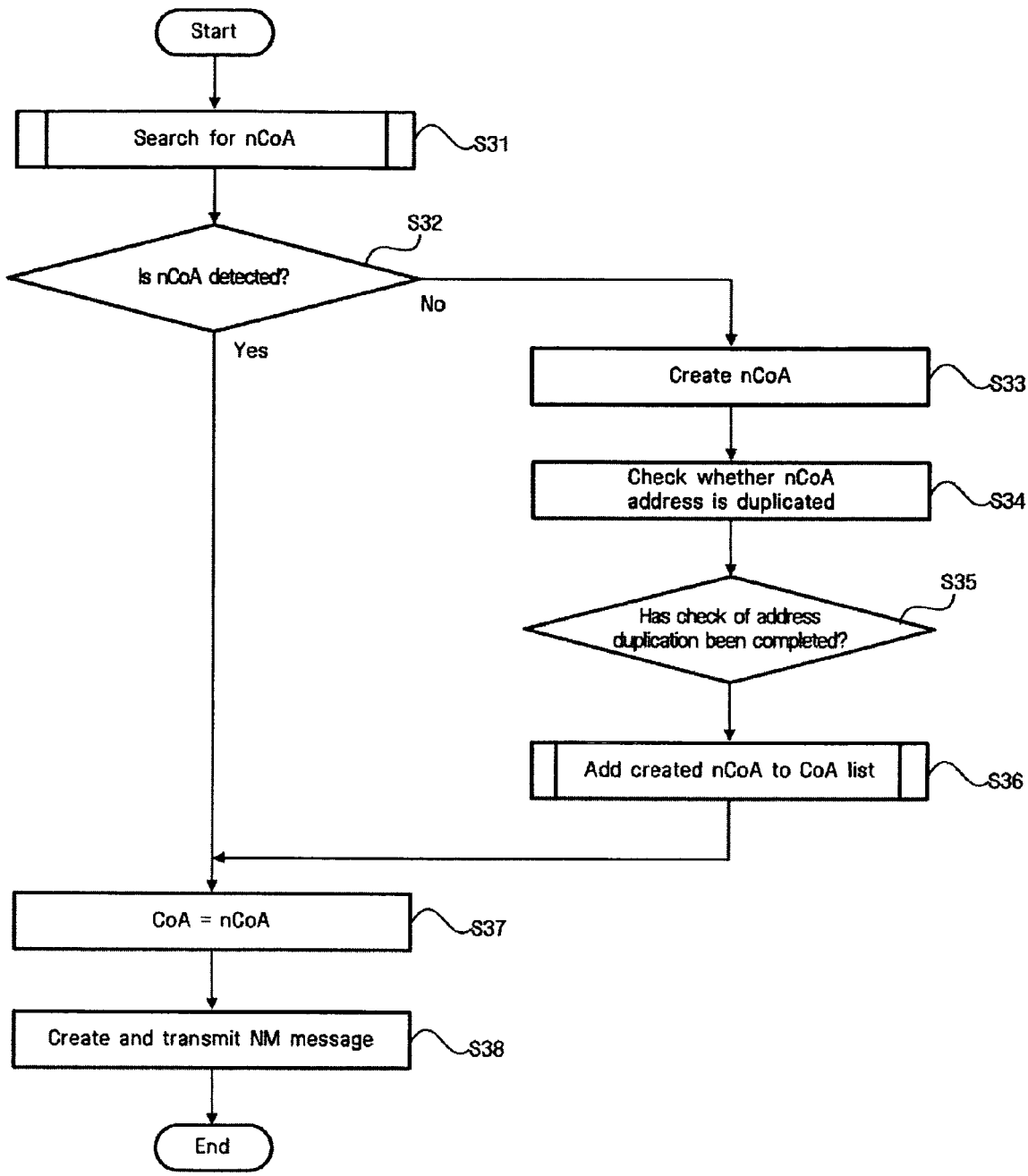
FIG. 10 is a flowchart schematically illustrating a handoff process in a handoff-processing unit according to one embodiment of the present invention.

FIG. 10 is a flowchart schematically illustrating a handoff process in the handoff-processing unit 155 according to one embodiment of the present invention. As shown in FIG. 10, the handoff-processing unit 155 first searches for an nCoA for the new access router 302 in the CoA list DB 159 through the CoA list-managing unit 157 in order to perform the handoff to the new access router 302 (S31).

The handoff-processing unit 155 then determines whether an nCoA for the new access router 302 has been detected (S32).

If it is determined that an nCoA for the new access router 302 has been detected, the handoff-processing unit 155 sets the searched nCoA to a CoA of the current access router (S37).

If it is determined that an nCoA has not been detected (S32), the handoff-processing unit 155 creates an nCoA for the new access router 302 by using Prefix information of the access router obtained from the NI Rep message (S33). The handoff-processing unit 155 then requests the new access router to check whether the created nCoA is duplicated (S34).

Thereafter, the handoff-processing unit 155 determines whether the check on the duplication of the address has been completed (S35). If the check on the duplication of the address has been completed, the handoff-processing unit 155 adds the created nCoA to the CoA list DB 159 through the CoA list-managing unit 157 (S36).

The handoff-processing unit 155 sets the detected or created nCoA to the CoA of the current access router (S37). Next, the handoff-processing unit 155 creates an NM message for notifying the current access router of the handoff to the new access router by using the nCoA and then transmits the created NM message to the current access router (S38).

Figure 11A:
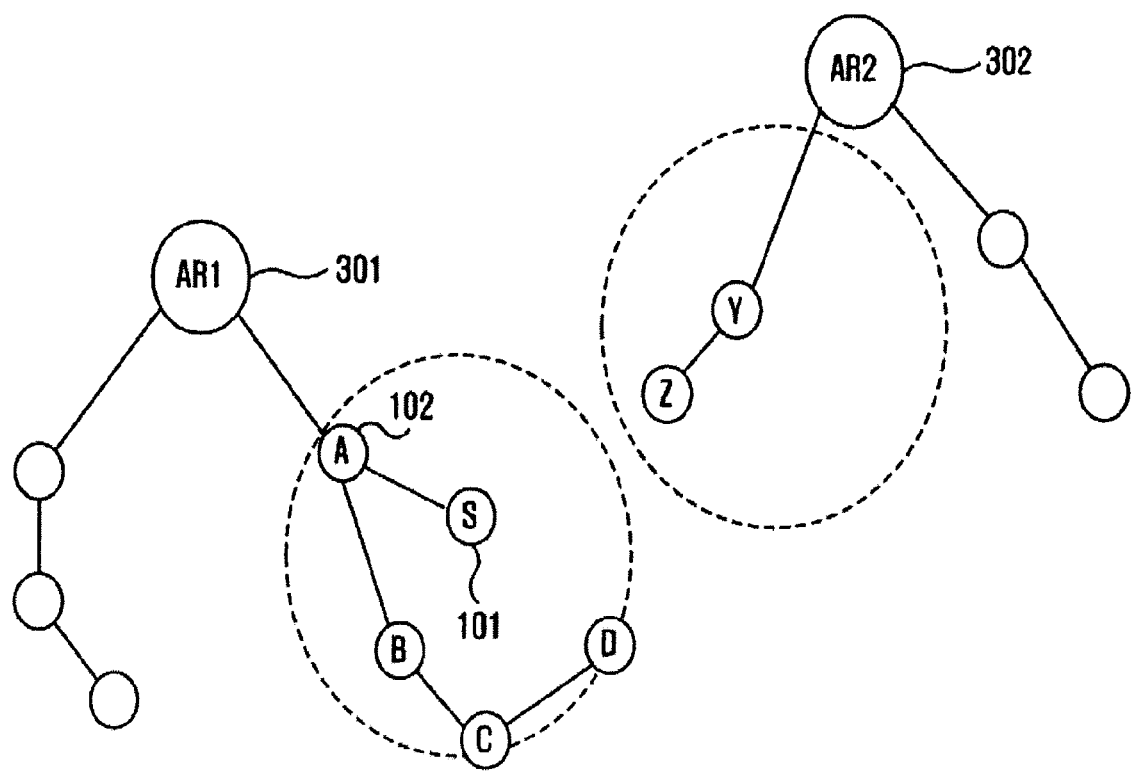
FIGS. 11a and 11b are views schematically illustrating handoff processes in network apparatuses provided with handoff modules according to an embodiment of the present invention.
Figure 11B:
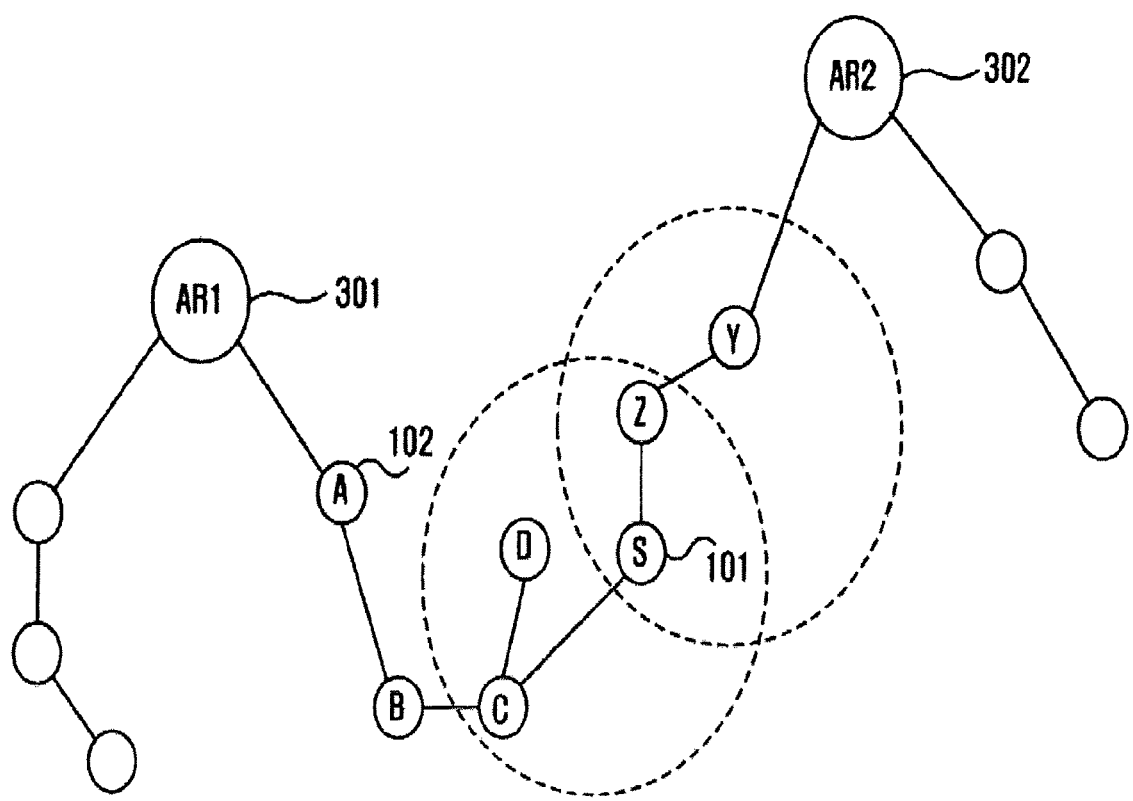

FIGS. 11a and 11b are views schematically illustrating handoff processes in network apparatuses provided with handoff modules according to an embodiment of the present invention.

As shown in FIG. 11a, a movement-determining unit 151 of network apparatus S among network apparatuses connected to the access router AR1 measures the signal strength of a packet received from network apparatus A and determines whether the signal strength is lower than an α-threshold value and higher than a β-threshold value.

As shown in FIG. 11b, if the signal strength of the packet received from network apparatus A is gradually reduced as network apparatus S gradually moves from the current access router AR1 to the new access router AR2, the movement-determining unit 151 determines whether the signal strength is lower than the α-threshold value and higher than the β-threshold value.

If it is determined that the signal strength is lower than the α-threshold value and higher than the β-threshold value, the movement-determining unit 151 creates an NI Req message and then broadcasts the NI Req message to network apparatuses A, B, C and D in a range of 1 hop in order to pre-configure a handoff to the new access router AR2 to which network apparatus S is moving.

Each of network apparatuses A, B, C and D that have received the NI Req message creates an NI Rep message. At this time, respective network apparatuses A, B, C and D check the NI Rep messages that have been sent to network apparatus S by the other network apparatuses A, B, C and D. If the NI Rep messages have the same access router address, network apparatuses A, B, C and D do not transmit the NI Rep messages. Otherwise, the NI Rep message is transmitted to the network apparatus S.

Accordingly, if the NI Rep messages transmitted from network apparatuses A, B, C and D in the range of 1 hop are received by network apparatus S, the movement-determining unit 151 of network apparatus S determines whether the signal strength of the packet received from network apparatus A is lower than the α-threshold value and higher than the β-threshold value in order to decide a handoff depending on the movement of network apparatus S.

If it is determined that the signal strength is lower than the α-threshold value and higher than the β-threshold value, the movement-determining unit 151 operates the router-configuring unit 153 in order to configure handoff information. The router-configuring unit 153 then creates an nCoA for the new access router AR2 by using Prefix information on the new access router AR2 obtained from the received NI Rep message.

Next, the router-configuring unit 153 checks whether the created nCoA is a duplicated address through the new access router AR2 and then adds the created nCoA to the CoA list.

If it is determined that the signal strength of the packet received from network apparatus A is lower than the β-threshold value since network apparatus S has been completely moved into the coverage of the new access router AR2 by the user, the movement-determining unit 151 operates the handoff-processing unit 155 to perform a handoff to the new access router AR2.

The handoff-processing unit 155 then searches for an nCoA, which is a CoA for the new access router AR2, in the CoA list. If an nCoA is not searched, the handoff-processing unit 155 creates an nCoA for the new access router AR2.

If an nCoA for the new access router AR2 is obtained through such a process, the handoff-processing unit 155 connects network apparatus S to the new access router AR2 by using the nCoA for the new access router AR2, sets the nCoA as a current CoA, and then notifies the access router AR1 of the handoff to the new access router AR2 by using an NM message.

According to the present invention described above, a handoff to a new access router located in a direction to which a network apparatus moves is pre-configured by detecting movement depending on the signal strength of a packet received from another network apparatus connected via a communication link. Therefore, there is an advantage in that a handoff can be stably performed when the network apparatus has completely moved into the coverage of the new access router.

Furthermore, the present invention has an advantage in that an increase of traffic in a MANET based on existing Mobile IPv6 can be minimized by requesting information on a new access router if movement is detected through the strength of a received signal.

Although the present invention has been described in connection with the embodiments illustrated in the accompanying drawings, the embodiments are merely illustrative. It will be understood by those skilled in the art that various modifications and changes can be made thereto.

Therefore, the technical spirit and scope of the present invention should be defined by the appended claims.

What is claimed is:

1. A network apparatus for a stable handoff in an IP-based mobile ad hoc network system, comprising:
a movement-determining unit for determining movement depending on a signal strength upon reception of a packet from at least one of other network apparatuses operating on a communication mobile ad hoc network, and deciding a handoff to a new access router;
a router-configuring unit for configuring information as pre-configured information on the new access router for the handoff by performing beforehand the handoff to the new access router according to results of determining movement in the movement-determining unit; and
a handoff-processing unit for performing the handoff to the new access router by using the pre-configured information according to the results of determining movement in the movement-determining unit,
wherein the movement-determining unit compares the signal strength with predetermined threshold values, broadcasts a neighbor information request (NI Req) message for requesting other network apparatuses in a range of 1 hop to transmit neighbor information, and determines a direction in which the network apparatus moves through reply messages transmitted in response to the NI Req message,
wherein the movement-determining unit creates a neighbor information reply (NI Rep) message using a router address of a current access router if the broadcasted NI Req message is received, checks the reply messages that are transmitted from the other network apparatuses to the network apparatus that has requested neighbor information, transmits the NI Rep message if there is no NI Rep message having the same router address as the router address of the current access router, and does not transmits the NI Rep message if there is NI Rep message having the same router address as the router address of the current access router.

2. The apparatus as claimed in claim 1, further comprising:
a care-of-address (CoA) list-managing unit for managing the information on the new access router that has been configured through the router-configuring unit; and
a CoA list database (DB) for storing the information on the new access router under the control of the CoA list-managing unit.

3. The apparatus as claimed in claim 1, wherein the threshold values comprises an α-threshold value for the signal strength of the packet that varies as the network apparatus moves from a coverage of a current access router into a coverage of a new access router, and a β-threshold value for the signal strength of the packet that varies when the network apparatus has completely moved into the coverage of the new access router.

4. The apparatus as claimed in claim 3, wherein the handoff to the new access router is decided if the signal strength is lower than the β-threshold value, or handoff information configuration is decided if the signal strength is lower than the α-threshold value and higher than the β-threshold value.

5. The apparatus as claimed in claim 1, wherein the router-configuring unit creates the information on the new access router by using Prefix information of the new access router obtained from a neighborhood information reply (NI Rep) message provided from the other network apparatuses by the movement-determining unit.

6. The apparatus as claimed in claim 2, wherein the handoff-processing unit detects a new care-of-address (nCoA) for the new access router from the CoA list DB through the CoA list-managing unit, connects the network apparatus to the new access router by using the nCoA, and terminates connection with a current access router.

7. A handoff method using a network apparatus for a stable handoff in an IP-based mobile ad hoc network system, comprising:

determining a movement according to a signal strength of a packet received from a first network apparatus operating on a communication mobile ad hoc network;

requesting neighbor information to collect information on a new access router in a region toward which a second network apparatus moves, according to the movement; and if a reply message in response to the requesting neighbor information is received, deciding a handoff according to the signal strength of the packet, wherein the operation of requesting the neighbor information is performed using a neighbor information request (NI Req) message, wherein the reply message is created using a router address of a current access router if the NI Req message is received, other reply messages transmitted from other network apparatuses to the second network apparatus that has requested the neighbor information are checked, the created reply message is transmitted if there is no reply message having the same router address as the reply message, and is not transmitted if there is NI Rep message having the same router address as the router address of the current access router.

8. The method as claimed in claim 7, wherein the operation of determining the movement according to the signal strength comprises comparing the signal strength with predetermined threshold values comprising a $\beta$-threshold value and an $\alpha$-threshold value and determining whether the signal strength is higher than the $\beta$-threshold value and lower than the $\alpha$-threshold value.

9. The method as claimed in claim 8, wherein the $\alpha$-threshold value is a threshold value for the signal strength of the packet that varies as the second network apparatus moves from a coverage of a current access router into a coverage of a new access router, and the $\beta$-threshold value is a threshold value for the signal strength of the packet that varies when the second network apparatus has completely moved into the coverage of the new access router.

10. The method as claimed in claim 7, wherein the operation of deciding the handoff according to the signal strength of the packet comprises the steps of:

determining whether the signal strength of the received packet is higher than a $\beta$-threshold value;

if it is determined that the signal strength of the packet is lower than the $\beta$-threshold value, performing the handoff to the new access router; and if it is determined that the signal strength of the packet is higher than the $\beta$-threshold value and lower than an $\alpha$-threshold value, pre-configuring an environment for the handoff to the new access router.

11. The method as claimed in claim 10, further comprising if the reply message is received, comparing an access router address of the reply message with a router address of a current access router through Prefix information obtained from the received reply message.

\* \* \* \* \*